A. VOELKER & N. MEURER.
APPARATUS FOR PRODUCING HOLLOW QUARTZ BODIES.
APPLICATION FILED SEPT. 14, 1911.
1,068,716.
Patented July 29, 1913.
4 SHEETS—SHEET 2.
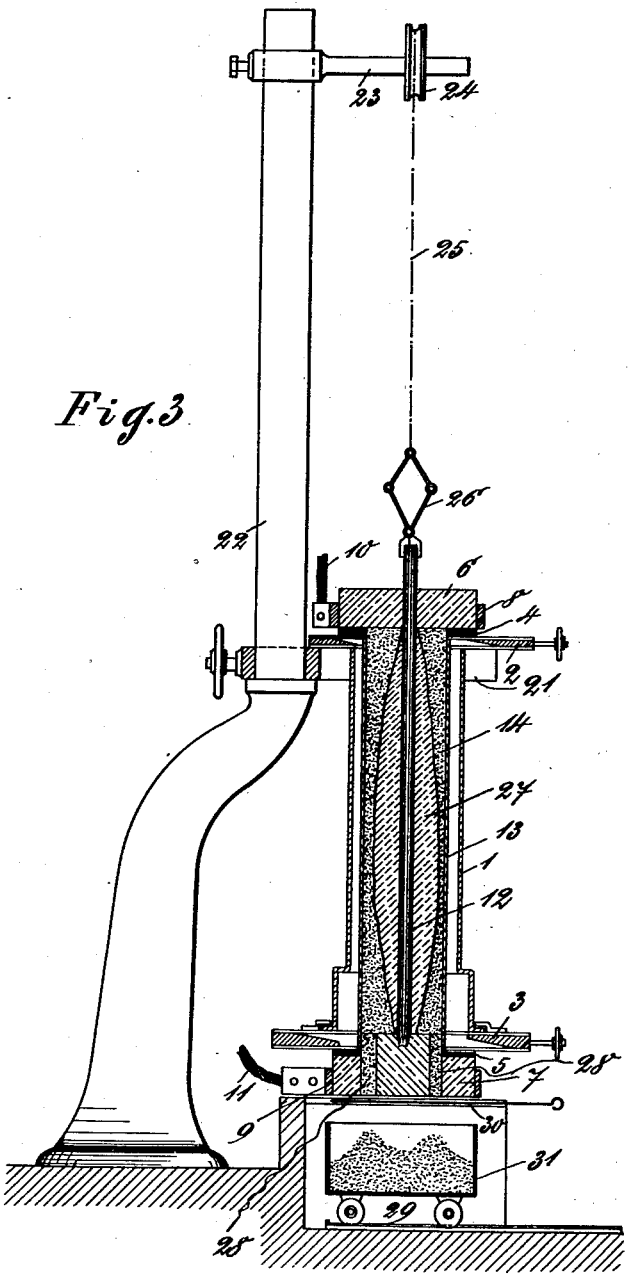

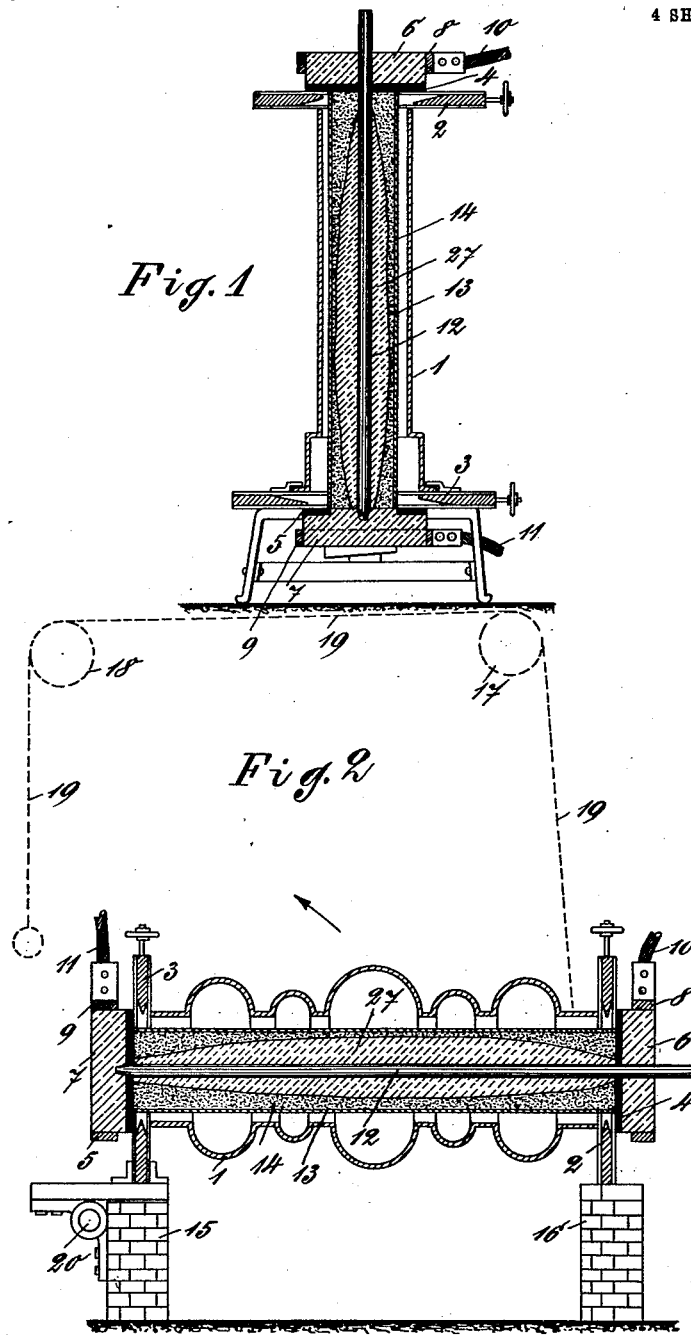

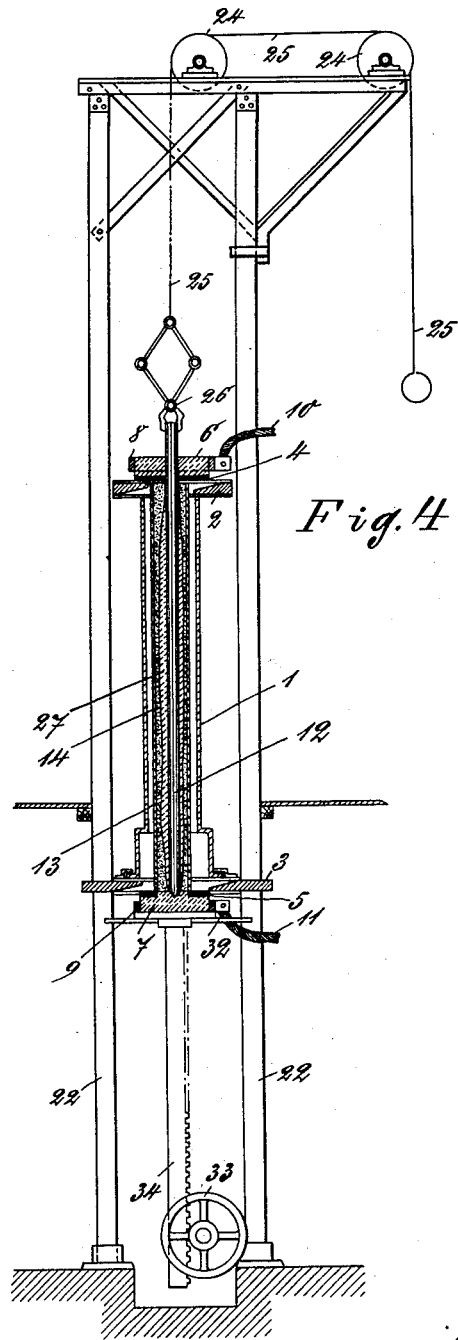

A. VOELKER & N. MEURER.
APPARATUS FOR PRODUCING HOLLOW QUARTZ BODIES.
APPLICATION FILED SEPT. 14, 1911.
1,068,716.
Patented July 29, 1913.
4 SHEETS—SHEET 4
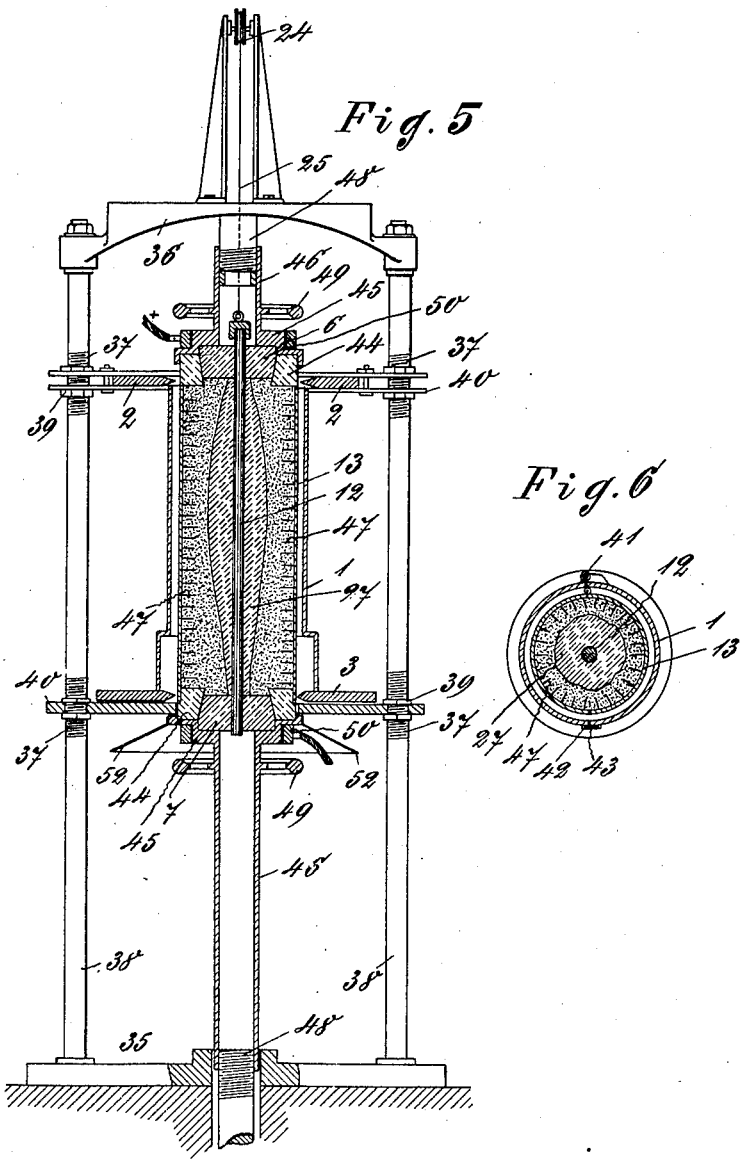

UNITED STATES PATENT OFFICE.

AUGUST VOELKER, OF BEUEL, NEAR BONN, AND NIKOLAUS MEURER, OF COLOGNE, GERMANY.

APPARATUS FOR PRODUCING HOLLOW QUARTZ BODIES.

1,068,716.         Specification of Letters Patent.       Patented July 29, 1913.

Application filed September 14, 1911. Serial No. 649,325.

*To all whom it may concern:*

Be it known that we, AUGUST VOELKER and NIKOLAUS MEURER, patent attorney, subjects of the German Emperor, and residing, respectively, at 77ª Siegburgerstrasse, Beuel, near Bonn, and 89/91 Hohestrasse, Cologne-on-the-Rhine, Rhineland, Kingdom of Prussia, Germany, have invented certain new and useful Improvements in an Apparatus for Producing Hollow Quartz Bodies, of which the following is a specification.

For fusing quartz by means of the electrical resistance heat generally the method is employed, which consists in giving the quartz body, having a dough like consistency and a cylindrical or fusiform shape, being formed around a carbon core the desired further shape by means of inflation with high pressure gases or vapors either immediately in the fusing chamber or in the open air after it has been removed from the fusing chamber. In the former instance the inflating medium, for instance compressed air, is introduced into the quartz body through the carbon core, which has been accordingly prepared, say perforated, so that the quartz body will after inflation still contain the core, whereas when the quartz is formed in the open air, that is outside of the fusing furnace, it is necessary to previously remove the core and then close the open ends of the quartz body by means of tongs or inflation nozzles for the inflating medium. The present invention belongs to the former, decidedly preferable method of forming the quartz bodies. The removing of the quartz body from the fusing chamber will namely entail, besides the great decrease in the outer plasticity of the quartz body in consequence of the drop of the temperature in the open air, particularly if the quartz body is of a small volume only, above all the disadvantage, that this is an operation both difficult and easily leading to the deformations and which can only be executed by skilled workers, and requires much strength, insensitiveness against great radiating heat and quickness, all abilities, which are required to a considerably lesser degree when the quartz body is left in the fusing chamber and is formed there.

The novel and characteristic feature of the present method consists in that the quartz body fused around a preferably vertical heating core is, contrary to the methods hitherto proposed, not protected against an unintended deformation of its cylindrical or fusiform shape, by the heating core being left in it after the quartz sand surrounding and supporting it has been removed, and it is thus supported by the core and the inflating medium is introduced through the hollow perforated core, but that after completion of the fusing process, with vertically disposed core at least one end, with horizontally disposed core both ends of the quartz body are seized in such a manner, that it must retain its position and its shape in the fusing chamber, whereupon the core is withdrawn, the loose sand surrounding the quartz body is removed by suitable means and then the inflating medium is introduced into the interior of the quartz body in known manner and while the ends of said body are simultaneously closed.

Several constructional forms of apparatus for carrying out the hereinbefore described method are exemplified in Figs. 1–6 of the accompanying drawings.

The first constructional form, Fig. 1, shows the arrangement of a mold 1 consisting of several sections between two cutting off devices 2 and 3 respectively on which follow insulating plates 4, 5 and the electrode plates 6, 7, which are encircled by the connection shoes 8, 9 of the cables 10, 11 respectively and hold the heating core 12. 13 is an auxiliary cylinder fitted into the mold 1, terminating at the insulating plates 4, 5 and serving to receive the charge 14 to be fused.

The constructional form according to Fig. 2 shows the arrangement in a horizontal furnace, which rests on brick piers 15, 16 and can be moved by means of a cable 19 running over sheaves 17, 18, around a hinge 20, so that it can be moved from its horizontal position into a vertical one.

According to Fig. 3 the arrangement shown in Fig. 1 is fitted to a pillar 22 with aid of a vertically adjustable supporting table 21, which pillar carries on its upper part a likewise vertically adjustable arm 23 with a pulley 24, over which runs the cable 25 of a tongs 26 which seizes the end of the heating core 12 projecting from the electrode plate 6, and serves to withdraw the same from the fused quartz body 27 after the fusing process has been completed. The lower electrode 7 is provided with passages 28 through which on a slide 30 arranged above a pit 29 being opened, the not fused sand will fall into a truck 31 running on rails, so that the material will not be soiled and the loose sand may be used for later fusings.

The arrangement according to Fig. 4, which is the same as the arrangement according to Fig. 3 may be used for making quartz bodies of different sizes, has a similar hoisting gear 24, 25, 26 for the heating core 12, but differs from the said arrangement by that the lower electrode 7 is supported by a plate 32, the cutting device 3 above said electrode being guided on pillars 22, the said plate 32 being pressed tightly against the electrode 7 by means of a hand wheel 33 operating a rack 34.

The operation is as follows: When in consequence of the passage of the electric current through parts 8, 6, 12, 7, 9 the quartz body formed around the core 12 has reached a sufficient thickness, the current is switched off and the core 12 is withdrawn from the quartz body either manually or according to Figs. 3 and 4 by means of the hoisting gear 24—26. Thereupon the upper electrode 6 is removed, so that the entire opening of the mold 1 or of the auxiliary cylinder 13 respectively is bared. The latter is now, while being simultaneously revolved around its axis drawn, according to Figs. 1 and 3 upward out of mold 1 and thereupon the two halves of the upper cutting device 2 are approached to each other by aid of the means provided for this purpose, hand wheels or the like, so that they will seize and hold the upper end of the quartz body 27 projecting into their range of travel. Now the lower electrode 7 is removed (according to Fig. 4), so that the quartz body will hang freely suspended from the upper cutting device 2 into the mold 1 after the not fused sand has been removed. Now the halves of the lower cutting device 3 are approached to each other so far, that they seize the lower end of the quartz body 27 and hold it in the same manner as above. Now the quartz body 27 is inflated by the introduction of the inflating medium and immediately after the two ends of the quartz body have been simultaneously closed by the approaching of the two halves of the two cutting devices, the quartz body will in consequence of such inflation lie close against the inside of the mold 1, whereupon the mold together with the quartz body in it is taken down and the latter may be removed by opening the two halves of the mold.

The inflating medium mentioned above may be compressed air or gases under high pressure. When compressed air is used, a tube is employed, one end of which is introduced into the upper end of the plastic body after the withdrawal of the core 12 and prior to the operation of the upper cutting device, whereupon the latter is operated for closing the upper end of the plastic body, so that the tongs press the quartz against the outside of the tube. Thereby the interior of the plastic body is hermetically closed, so that on the admission of the compressed air through the tube this medium can blow out the quartz body. When gases under pressure are to be used, a foreign body (for example a potato) capable of being wholly or partially gasified by the extreme heat of the quartz (about 2200° centigrade) is introduced into the cavity of the plastic body, immediately after which the cutting device is operated, as described in one pending application filed by our Dr. August Voelker, Serial No. 512,693 of August 13, 1909.

For facilitating the loosening of the not fused caked sand surrounding the quartz body it is advisable to provide projections, preferably prongs, nails and the like on the inside of the auxiliary cylinder.

A constructional form showing this feature is shown in Figs. 5—6 of the accompanying drawing. On pillars or standards 38 joined by plates 35 and 36, and provided with screw threads 37 at suitable sections of their whole length cross beams or plates 40 are arranged, vertically adjustable by means of nuts 39, between which beams 40 the mold 1 forming the outer wall of the fusing chamber, consisting of two several sections and open at top and bottom, is clamped. The mold serves in the present instance for making a socket pipe and consists of two sections hinged together at 41 and locked together in an easily detachable manner at 42, 43 by means of a wedge, drop bolt, slide or the like. The lower and top openings of the mold 1 are to the greater part each filled by one electrode head, which consists of a centrally bored carbon block 6, 7 having preferably the shape of a truncated cone and surrounded by an annular lining 44 of fire clay or quartz, which is fitted into a metallic socket 45 and extends upward in form of a tubular extension 46. The fire clay ring 44 serving to insulate the heating core 12 concentrically connecting the electrodes 6, 7 from the metallic wall 1 serves to hold a vessel 13 placed into the mold 1 and having in the present instance a cylindrical shape; this vessel 13 reaches above close up to the upper fire clay ring 44 and is provided on its inside with numerous projections, preferably prongs, nails 47 and the like. The vessel 13 thus separates the heating core 12 from the inner wall of the mold 1 and serves to receive the quartz sand and thus as envelop for the fusiform quartz body 27 to be fused of the quartz sand. The tubular extensions 46 are provided with female threads and engage therewith on corresponding threaded bolts or pillars 48, so that, when the metallic caps 45 encircling the electrodes 6, 7 or the fire clay rings 44 are turned by suitable means, for instance hand wheels 49 or the like, the tubular extensions 46 may move in a vertical direction on the pillars 48. A turning of the feeder cable may be avoided by the connection shoes 50 of the cables being made in form of rings or similar to collector brushes, sliding on the metallic caps 45 conductively encircling the electrodes 6, 7.

The mold 1 does not rest directly on the plate 40 but on a plate like cutting device 3 slightly projecting beyond the opening in plate 40. This cutting device may be constructed in known manner and consist of two plates, arranged in the same horizontal level, which have each a V-shaped recess on their inner edge, the inner edge being at the same time tapered. If these plates are moved toward each other the V-shaped recesses will seize the body between them and construct it at four points and tend to shear off at their further advance.

The operation is the following: When in consequence of the passage of the electric current through parts 50, 45, 6, 12, 7 the quartz body formed around the core has reached a sufficient thickness, the current is switched off and the core 12 is withdrawn by means of the hoisting gear 25, 24 from the quartz body. Then the upper electrode 6 is screwed up so that the whole upper opening of the mold 1 or of the vessel 13 is laid open. By actuating the means provided for the upper cutting device 2 the halves of this cutting device are approached to each other so far, that they will seize and hold the upper end of the quartz body projecting into their range of travel. Now the lower electrode 7 together with the vessel 13 supported by the respective fire clay ring 44 is screwed down. Thereby the projections 47 of the vessel 13 will loosen the sand surrounding the quartz body and caked by the heat radiated by said body 27, which sand will fall over the hood 52 into containers suitably provided (not shown) so that the quartz body held by the upper cutting device will after the removal of the sand hang freely in the mold 1 cleared by the vessel 13 having been lowered, whereupon the lower cutting device is closed and the quartz body 27 is inflated in the manner hereinbefore described with reference to Figs. 1—4.

We claim:

1. In an apparatus of the class described, the combination with a mold, of two centering gripping devices adapted to close the ends of said mold, two electrodes adapted to be connected with said two centering gripping devices, an electric resistance core in the axis of said mold adapted to pass through the upper electrode and to engage in a recess of the lower electrode, a jacket within said mold leaving an annular space between it and the resistance core adapted to contain the raw material, means for insulating said jacket from said two electrodes. and means for passing an electric current through said two electrodes and said resistance core.

2. In an apparatus of the class described, the combination with a mold, of two centering gripping devices adapted to close the ends of said mold, two electrodes adapted to be connected with said two centering gripping devices, an electric resistance core in the axis of said mold adapted to pass through one electrode and to engage in a recess in the other electrode, a jacket within said mold leaving an annular space between it and the resistance core adapted to contain the raw material, means for insulating said jacket from said two electrodes, means for passing an electric current through said two electrodes and said resistance core, and means for turning said mold from the horizontal position, in which the fusion is effected, into a vertical position for blowing out the plastic body and vice versa.

3. In an apparatus of the class described, a jacket adapted to contain the raw material and longitudinally divided into two parts and provided on the inside with projections for loosening the unfused sand during the withdrawal, and means for locking up said jacket.

In testimony whereof we hereto affix our signatures in presence of two witnesses.

AUGUST VOELKER.
NIKOLAUS MEURER.

In presence of—
KARL SEHUH,
ANDERS SCHMITZ.